June 13, 1967 W. H. McLELLAN 3,325,761
PRESSURE TRANSDUCER
Filed Jan. 11, 1965

INVENTOR.
WILLIAM H. McLELLAN,
By His Attorneys
Spensley & Horn

United States Patent Office 3,325,761
Patented June 13, 1967

3,325,761
PRESSURE TRANSDUCER
William H. McLellan, Pasadena, Calif., assignor to Electro-Optical Systems, Inc., Pasadena, Calif., a corporation of California
Filed Jan. 11, 1965, Ser. No. 424,551
5 Claims. (Cl. 338—4)

This invention relates generally to pressure pickup devices and more particularly to a new diaphragm for such devices which has thickness variations arranged in a predetermined fashion to achieve a controllable distribution of measurable strain characteristics.

In devices for pressure measurement or gauging of stresses and strains diaphragms are frequently employed to sense the pressure changes therein. If such diaphragms are generally of circular configuration and anchored at the perimenters thereof to a wall of the pressure transducer in which used, it becomes extremely difficult to position properly strain gauging elements to such diaphragms at the wall-to-diaphragm junction where it would be most desirable to place such gauges. It is therefore necessary to locate these gauges at points away from the junction of the diaphragm and wall towards the center of the diaphragm. This practice has resulted in strain amplitude values being measured which equal only about half of the actual maximum compressive strain present on the unpressurized surface of the diaphragm at this junction.

Additionally, such prior art diaphragms show an inequality in the ratio of peak compressive strain to peak tensile strain factors therein which necessitate more complex gauge positioning patterns to overcome the inequalities in sensing the stresses and strains on the diaphragm. These conditions produce non-linear responses in strain gauges generally used in such devices. Consequently more complex electrical circuit configurations are required which make necessary a greater variety of adjustments. Such prior art devices are therefore more costly to fabricate and more time-consuming in their use and adjustment.

In the present invention a new diaphragm configuration is contemplated which overcomes the difficulties encountered in the prior art techniques and provides for greater equality between the compressive strain and tensile strain factors therein so that strain gauges may be employed in less complex circuit configurations and with greater linearity of output in response to pressures being measured.

The improved linearity of the new diaphragm with respect to compressional and tensile forces makes the new diaphragms usable with p-silicon gauges. p-Silicon gauges usually become progressively more non-linear as the range between the compressive versus the tensile strain amplitudes becomes greater. The total bridge output from a resistance bridge composed of such p-silicon resistance arms attached to diaphragms according to this invention will be more linear.

In accordance with this invention the new diaphragm is configured so that the center area is thinner than the outer perimetral areas and the pressure receiving surface is smaller in diameter than the opposite or gauging surface. The pressure receiving surface is uniform and planar, whereas the gauging surface has a central inward dimensional difference creating a thinner central area.

Strain gauges are bonded to the diaphragm at points of the gauging surface thereof which are opposite the wall of the smaller diameter above it. Other strain gauges are placed on the gauging surface at the center of the central well formed by the thickness difference in the center of the diaphragm.

The prior art diaphragms showed a substantial difference in tensile versus compressional strain amplitudes.

The new diaphragm configuration according to this invention shows a tensile strain amplitude approximately equal to compressive strain amplitude in response to pressure applied thereto. Thus the tension gauges applied to the gauging surface at the very center of the inner dimensional change step and the compression gauges applied to the gauging surface on the circle of the smaller diameter of the opposite pressure receiving surface will sense approximately equal strains for any pressure applied to the pressure surface and the output of the bridge in which the gauges are connected will be a linear function of strains due to these pressures.

The new diaphragm is more stable due to the elongated anchor resulting from the difference in diameter between the pressure and gauging surfaces.

By tapering the outermost surfaces of the gauge side of the diaphragm linearity is greater.

Readings made with gauges on diaphragms according to this invention are repeatable due to the ability to use longer gauge elements that are more easily bonded to areas of low stress.

An even further advantage of the new diaphragm configuration of this invention is that smaller transducer elements are possible by their use.

Accordingly therefore it is an object of this invention to provide a diaphragm and gauge combination for pressure sensing devices which produce a more linear output and may be made smaller than conventional pressure sensing devices.

It is another object of this invention to provide a linearly responsive pressure sensing system including a diaphragm in which there are surfaces of different thicknesses at different diameters on which gauges are positioned.

It is a further object of this invention to provide a thickness varying diaphragm for pressure sensing devices which exhibits uniform and repeatable tensile and compressional strains in response to pressures applied thereto in such pressure sensing devices.

It is still another object of this invention to provide a novel stepped diaphragm for pressure sensing devices, opposite surfaces being of different diameters, the smaller diameter surface being uniform and planar, the larger diameter surface having a truncated conical depression therein resulting in areas of differing thicknesses across the diameters of the diaphragm.

It is a still further object of this invention to provide a diaphragm for pressure sensing devices whereon gauge elements may be placed for most efficient and uniform response to tensile and compressional strains therein.

These and other objects of this invention will become more clear from the specification which follows in which representative embodiments of the invention are described and shown in the drawings. The invention should not be construed as limited to these embodiments since, in the light of the teachings herein, those skilled in the arts appertaining thereto will be able to devise other diaphragms in accordance with these teachings within the ambit of the appended claims.

Figure 4:
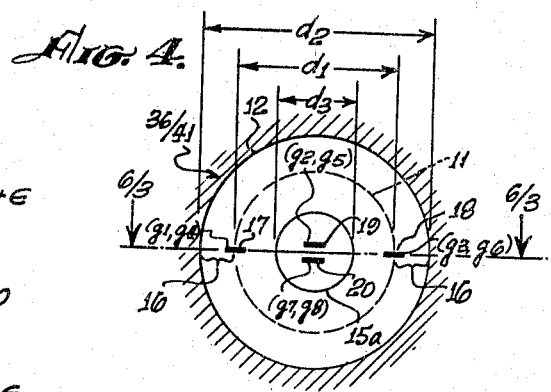
FIGURE 4 is a plan view of the gauging surface of a diaphragm according to this invention showing gauges attached thereto in accordance with the circuit diagram shown in FIGURE 5.
Figure 5:
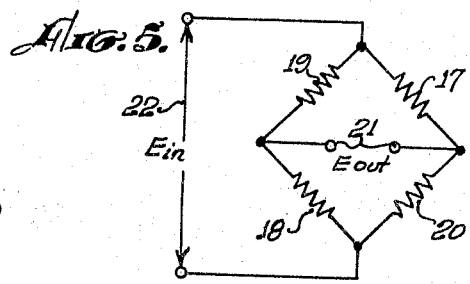
Figure 3:
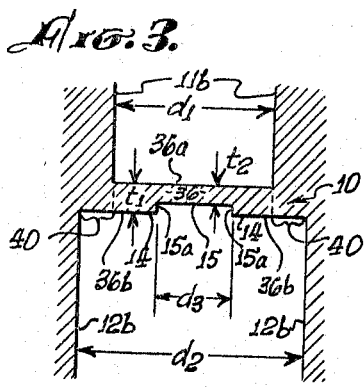
FIGURE 3 is a cross-sectional schematic drawing of one form of stepped diaphragm according to this invention.
Figure 6:
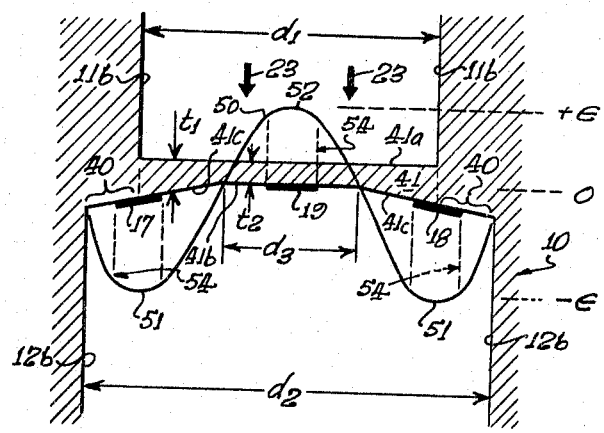

FIGURE 5 is a bridge circuit diagram of the electrical connection of the gauges positioned on a diaphragm according to this invention as shown in FIGURE 4; and FIGURE 6 is a composite strain wave form and cross-sectional schematic diagram, the latter being similar to the configuration shown in FIGURE 3 but differing in detail, to illustrate the tensional and compressional relationships of the diaphragm under a pressure force applied thereto.

It is well known that even relatively rigid members subjected to a force are deformed by these forces according to the elasticity of the member. The forces applied to the member are called stresses and the degree of yield in the member to the forces is called strain. Generally speaking, the strain is proportional to the stress producing it. Therefore devices for measuring the pressures (stresses) upon a surface can be made by sensing the strain upon that surface due to the pressure applied thereto.

Figure 1:
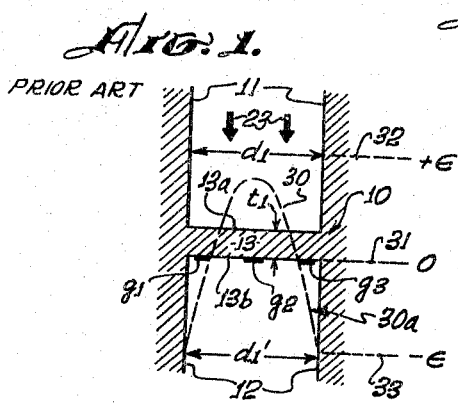
FIGURE 1 is a representative cross-sectional schematic drawing of a diaphragm as employed in prior art pressure sensing devices.

A typical prior art pressure sensing mechanism is shown in FIGURE 1 wherein a pressure transducer body 10 has anchored therein a diaphragm 13 with an upper or pressure receiving surface 13a and a lower or strain gauge receiving surface 13b. The diameter $d1$ of surface 13a is the same as the diameter $d1'$ of surface 13b, and the thickness $t1$ of diaphragm 13 is uniform over its entire area.

When pressure as indicated by thickened arrows 23 is applied to surface 13a strain gauges $g1$ and $g3$, attached near the anchored perimeter of diaphragm surface 13b in walls 11-12, are subjected to compressional strains while the strain gauge $g2$, one of a pair attached to the center of diaphragm surface 13b, is subjected to tensile strains.

The dashed line waveform 30 superimposed on the diaphragm diagram of FIGURE 1 shows the relationship of the amplitude of these strains with respect to a zero line 31 in the plane of gauging surface 13b. The designation $+\epsilon$ represents tensile strains while the designation $-\epsilon$ represents compressional strains on diaphragm 13 resulting from the pressure applied to surface 13a. The strains on diaphragm 13 near wall 11-12 cannot be measured effectively by strain gauges such as $g1$ and $g3$ because the gauges cannot be positioned where the greatest strain is in fact: at the anchor junction of wall 11-12 and diaphragm 13. Therefore the gauges must be positioned a short distance away from the point of anchor of diaphragm 13 in wall 12.

The dashed curve 30 is indicative of the peak strains encountered in the diaphragm 13 under pressure. It is to be noted that the peak compressional strain is actually at the diaphragm wall junction 11-12-13, but as explained above a gauge $g1$ or $g3$ cannot be positioned on this peak strain point which results in the difference in output of a bridge utilizing such a device in response to the compressive strain as compared to that in the peak tensile direction for which strain gauges such as $g2$ can be properly positioned.

Were it possible to in fact position gauges at the anchor junction 11-12-13 the normal result would have been a greater peak compressional strain than tensile strain. However, the necessity for moving the gauges $g1$, $g3$ closer to the center of the diaphragm 13 creates a resulting strain indication for the compressional strain which is actually less than that of the tensile strain.

This positioning of the compressional strain gauges in prior art devices is a source of wide variation in output. The position dependency of such prior art systems makes it difficult to achieve repeatable results from unit to unit.

Furthermore, as should be obvious from curve 30 in FIGURE 1, the slope of the strain gradient 30a at the position of the compressive strain gauges $g1$ or $g3$ is extremely great and this results in an output response due to the position of the gauge whereby very slight differences in position from unit to unit produce substantial differences in output of the bridge with the same pressure values.

Figure 2:
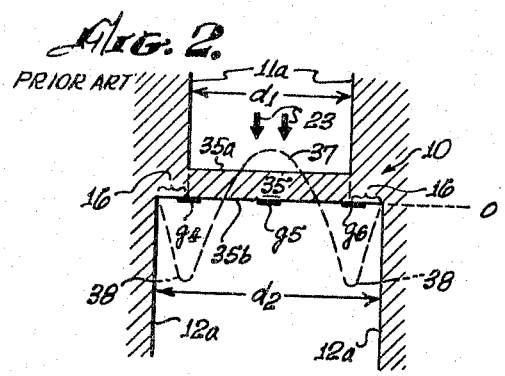
FIGURE 2 is a cross-sectional schematic drawing of an earlier form of stepped diaphragm showing a development towards the present invention.

In FIGURE 2 an improved pressure transducer is shown with certain differences in the detail of diaphragm 35 from diaphragm 13 in FIGURE 1. The transducer of FIGURE 2 which is one step towards the diaphragm of this invention differs particularly in that the diameter $d1$ of the pressure surface 35a of diaphragm 35 is smaller than the diameter $d2$ of gauging surface 35b thereof. If strain gauges $g4$ and $g6$ are bonded on gauging surface 35b of diaphragm 35 directly beneath the diametral limits of upper walls 11a which are smaller than lower walls 12a, and $g5$ and a fourth gauge like $g5$ (see FIGURE 4) are bonded at the center in a position similar to that of $g2$ in FIGURE 1. the strain output waveform (due to a pressure 23) as indicated in the dashed line 37 of FIGURE 2 will have tensile and compressive peaks coincident with gauge positions. Here it may be seen that the compressional strain peaks $-\epsilon$ at 38 are still greater in amplitude than the tensile strain peaks $+\epsilon$ at 39, but more nearly equal than is the case with the prior art diaphragm 13 of FIGURE 1. It is to be noted that with the diaphragm 35 of FIGURE 2 the anchor portion 16 thereof to walls 11a, 12a is elongated on the gauge side of diaphragm 35.

In FIGURE 3 a schematic cross-sectional illustration of an embodiment of the new diaphragm of this invention shows how tensile and compressional peaks may be equalized through the addition of step 15a inward as shown at 15 in the center of the gauge side 36b of diaphragm 36 in addition to the elongated anchor portion 40 as also shown in FIGURE 2 at 16. Thus there are three concentric diametral areas to be considered in the operation of the novel diaphrgam 36. These are the diameter $d1$ of the pressure surface 36a between walls 11b above the pressure surface, the diameter $d2$ of the outer gauging surface 14 between walls 12b below diaphragm 36, and the depression 15 with a diameter $d3$ between walls 15a of depression 15. The diaphragm 36 thereby has one thickness $t1$ at the surfaces between the perimeter of diameter $d3$ (15a) and of diameter $d1$ (36a) and a second thickness $t2$ across diameter $d3$ which is thinner than $t1$ across the diameter $d1$. The gauge surface 14 between the perimeter of $d2$ and $d3$ includes the elongated anchor 40 of diaphrgam 36.

In FIGURE 6, in somewhat enlarged detail, the configuration of a diaphragm 41 similar to 36 of FIGURE 3 is shown with a weveform 50 superimposed thereon which represents the strains of a compressional nature peaking at 51 and those of a tensile nature peaking at 52 which result from pressures P shown by the heavy arrows 23 applied to pressure surface 41a of a diaphragm 41. In this embodiment the gauging surface (41b, 41c) may be described as having a depression which is in the shape of a shallow frustum of a cone. The flat surface of the central circular gauging surface 41b is thinner than the portions of the gauging surface 41c on the slopes approaching the perimeter of gauge surface 41b.

With further reference to FIGURE 4 a plan view is shown of gauging surface 14, 15, 41b, 41c of a disc-like diaphragm such as 36 or 41. Strain gauge devices 17, 18, 19 and 20 are shown attached to diaphragm 36, 41 corresponding to the positions thereof on the anchor portion of gauging surface 14, 41c (gauges 17, 18) and on the central portion of gauging surface 15 in diametral area $d3$ and the flat surface 41b of diaphragm 41. The opposite surface of diaphragm 36 or 41, not seen in this figure, is smooth and planar as may be seen in FIGURES 3 and 6 at 36a and 41a.

In FIGURE 5 the electrical connection of gauges 17–20 is shown in a bridge circuit to which a voltage of appropriate character is applied at diagonal terminals 22 in the manner well known to the art and an output measurement obtained across diagonal terminals 21.

A typical diaphragm 36 or 41 in accordance with this invention as hereinabove described has been built in which a transducer structure with a nominal diameter $d1$ (11a, 11b, 41a) of a predetermined value was used as employed in typical pressure gauges.

The diameter $d2$ was at least greater than $d1$ but was found to be not of a critical value with respect to $d1$.

The diameter of depression 15 (FIGURE 3) and 41b (FIGURE 6) was found to be best at .63 $d1$ at the neutral stress circle of diaphragm 36 or $t1$.

The nominal thickness $t1$ at the edge 40 of diaphragm 36 is of some particular value related to the pressures involved in the use of the transducer. The thickness at the central depression 15 in diaphragm 36 is best at a value of .707 of the thickness of $t1$. The ratio $t2/t1$ (.707) was experimentally determined.

In a typical unit according to FIGURE 3:

| | Inches |
|---|---|
| $d1$ | .500 |
| $d2$ | .600 |
| $d3$ | .315 |
| $t1$ | .020 |
| $t2$ | .014 |

In a typical unit according to FIGURE 3 when used for higher pressures the ratio $t2/t1$ approaches unity.

Gauge elements for gauges 17–20 are of diffused p-silicon with a resistance value of 5000 ohms. For a full scale pressure range of 150 p.s.i. the typical unit was found to have a non-linearity of .08% and a hysteresis of .05% and withstood a pressure overload of five times the nominal limit with no change in its properties.

In units constructed with diaphragms of the configuration of FIGURE 6 the slope amplitude or angle with respect to a horizontal plane of diametral area 40, 41c is lesser for small pressures than for larger pressures. The particular pressure range for which a specific unit is designed will detemine the ratio of thickness of the central area 41b to the thickness at the point of the slope on gauge surface 41c beneath the upper wall 11b at which gauges 17–18 are placed.

The particular feature of operation of the stepped article 36 and the frusto-conical article 41 is the creation of an area at which strain gauges may be placed for the most efficient compressional strain measurement and tensile strain measurement where the transition peak of the strain curve such as 50 (FIGURE 6) is relatively blunt as at 51 or 52 so that more uniform and readily repeatable results may be had from the strain gauges from unit to unit, and longer strain gauge elements may be used, particularly in the compressional strain measurement, an additional factor in reliability and repeatability of results.

In FIGURE 6 at 54 the location of such longer gauge elements is indicated by the dashed lines 54. Gauge elements such as 17–18, positioned as shown at 54, provide a more uniform compressive strain condition indicated at 51 than is the case with either the prior art devices of FIGURE 1 or the device according to this invention shown in FIGURE 2. The more equal and smaller gradients at peaks 51, 52 provide a wider range of positioning within which the repeatable results above defined are obtained.

What is claimed is:

1. In a pressure transducer having a cylindrical upper pressure receiving bore and a cylindrical lower bore of larger diameter than said pressure receiving bore, said lower bore being concentric and coaxial with said upper bore and joined thereto, a pressure sensing diaphragm comprising:
    a disc-like structure having an upper pressure receiving surface of uniform planar character and a lower gauging surface;
    a central flat depression and a perimetral slope in said gauging surface between said flat depression and the perimeter of said gauging surface;
    the perimeter of said pressure surface diameter terminating in the walls of said upper bore, the perimeter of said gauging surface terminating in the walls of said lower bore, the difference in diameter therebetween forming an elongated anchor for said diaphragm in said pressure transducer;
    strain gauges being positioned and bonded on diametrally opposite sides of said perimetral slope of said gauging surface beneath the walls of said upper bore and in the center of said depression, said gauges being electrically connected in a bridge configuration, whereby, when pressure is applied to said pressure surface of said diaphragm, said strain gauges will respond to the strains in said diaphragm at said bonded positions thereof on said diaphragm, and produce appropriate outputs in said electrically connected bridge.

2. In a pressure transducer as defined in claim 1, wherein said central depression in said gauging surface is frusto-conical.

3. In a pressure transducer as defined in claim 1, wherein said central flat depression is circular and has a diameter of about 0.63 times the diameter of said upper pressure receiving bore.

4. In a pressure transducer having a cylindrical upper pressure receiving bore and a cylindrical lower bore of larger diameter than said pressure receiving bore, said lower bore being concentric and coaxial with said upper bore and joined thereto, a pressure sensing diaphragm comprising:
    a disc-like structure having an upper pressure receiving surface and a lower gauging surface;
    a central flat depression and a perimetral slope in said gauging surface between said flat depression and the perimeter of said gauging surface;
    the perimeter of said pressure surface diameter terminating in the walls of said upper bore, the perimeter of said gauging surface terminating in the walls of said lower bore, the difference in diameter therebetween forming an elongated anchor for said diaphragm in said pressure transducer; and
    strain gauges being positioned and bonded on diametrally opposite sides of said perimetral slope of said gauging surface beneath the walls of said upper bore and in the center of said depression, said gauges being electrically connected in a bridge configuration, whereby when pressure is applied to said pressure surface of said diaphragm, said strain gauges will respond to the strains in said diaphragm at said bonded positions thereof on said diaphragm, and produce appropriate outputs in said electrically connected bridge.

5. In a pressure transducer having a cylindrical upper pressure receiving bore and a cylindrical lower bore of larger diameter than said pressure receiving bore, said lower bore being concentric and coaxial with said upper bore and joined thereto, a pressure sensing diaphragm comprising:
    a disc-like structure having an upper pressure receiving surface and a lower gauging surface;
    a central circular flat depression and a perimetral slope in one of said upper and lower diaphragm surfaces, said perimetral slope extending from said flat depression to the surface perimeter, the diameter of said flat depression being less than the diameter of said upper pressure receiving bore, the other of said diaphragm surfaces being of uniform planar character;
    the perimeter of said pressure surface diameter terminating in the walls of said upper bore, the perimeter of said gauging surface terminating in the walls of said lower bore, the difference in diameter therebetween forming an elongated anchor for said diaphragm in said pressure transducer; and strain gauges being positioned and bonded in the center of said gauging surface and on diametrally opposite sides of said gauging surface beneath the walls of said upper bore, said gauges being electrically connected in a bridge configuration, whereby when pressure is applied to said pressure surface of said diaphragm, said strain gauges will respond to the strains in said diaphragm at said bonded positions thereof on said diaphragm, and produce appropriate outputs in said electrically connected bridge.

References Cited

UNITED STATES PATENTS

| | | | |
|---|---|---|---|
| 2,643,869 | 6/1953 | Clark | 338—2 |
| 2,848,892 | 8/1958 | Hoffman | 338—5 |
| 3,071,745 | 1/1963 | Stedman | 338—2 |
| 3,128,628 | 4/1964 | Lebow | 338—36 |
| 3,130,382 | 4/1964 | Laimins | 338—5 |
| 3,139,598 | 6/1964 | Ruge | 338—4 |
| 3,180,139 | 4/1965 | Soderholm | 338—5 |
| 3,199,057 | 8/1965 | Gindes et al. | 338—5 |
| 3,213,400 | 10/1965 | Gieb | 338—5 |
| 3,221,283 | 11/1965 | Ziggel | 338—4 |
| 3,277,698 | 10/1966 | Mason | 338—2 |
| 3,278,882 | 10/1966 | Love | 338—5 |

RICHARD M. WOOD, *Primary Examiner.*

ANTHONY BARTIS, *Examiner.*

W. D. BROOKS, *Assistant Examiner.*